(12) United States Patent
Ma et al.

(10) Patent No.: US 6,347,313 B1
(45) Date of Patent: Feb. 12, 2002

(54) INFORMATION EMBEDDING BASED ON USER RELEVANCE FEEDBACK FOR OBJECT RETRIEVAL

(75) Inventors: Wei-Ying Ma, Fremont; Catherine S. Lee, Irvine; HongJiang Zhang, Mountain View, all of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/260,215

(22) Filed: Mar. 1, 1999

(51) Int. Cl.$^7$ .............................................. G06F 17/30
(52) U.S. Cl. .................................. 707/3; 707/4; 707/5
(58) Field of Search ............................... 707/2, 3, 4, 5, 707/6

(56) References Cited

U.S. PATENT DOCUMENTS

| | | | |
|---|---|---|---|
| 5,696,964 A | | 12/1997 | Cox et al. .................... 395/605 |
| 5,852,823 A | * | 12/1998 | De Bonet ....................... 707/6 |
| 5,893,095 A | * | 4/1999 | Jain et al. ...................... 707/6 |
| 5,899,999 A | * | 5/1999 | De Bonet ....................... 707/6 |
| 5,987,456 A | * | 11/1999 | Ravela et al. ................... 707/5 |

\* cited by examiner

Primary Examiner—Frantz Coby

(57) ABSTRACT

A method and system for indexing and retrieving database objects, such as images, include a database manager which initializes database objects based on vectors for values of quantified features associated with the database objects. Similar database objects are grouped into common clusters that are based on system-perceived relationships among the objects. For each search session, a vector for a search query is calculated and database objects from the closest cluster within feature space are selected for presentation at a user device. The user indicates which of the selected objects are relevant to the search session and which of the objects are irrelevant. If one of the clusters includes both relevant and irrelevant objects, the cluster is split into two clusters, so that one of the resulting clusters includes the relevant objects and the other cluster includes irrelevant objects. The correlation matrix is updated to indicate that the resulting clusters have a weak correlation. If two of the clusters include database objects which were indicated to be relevant to the search session, the correlation matrix is updated to indicate that the two clusters have a strong correlation. To avoid an excessive proliferation of database clusters, mergers are performed on clusters which are closely located within the feature space and share a strong correlation within the correlation matrix. Following continued use, the groupings of objects into clusters and the cluster-to-cluster correlations will reflect user-perceived relationships.

23 Claims, 7 Drawing Sheets

INFORMATION EMBEDDING BASED ON USER RELEVANCE FEEDBACK FOR OBJECT RETRIEVAL

TECHNICAL FIELD

The present invention relates generally to database object indexing and retrieval and more specifically to content-based multimedia retrieval that is responsive to user relevance feedback.

DESCRIPTION OF THE RELATED ART

Due to the rapidly growing amount of digital multimedia data available via the Internet or stored on private systems, there is a need for effective techniques for managing large multimedia databases. Content-searchable image database management systems often use an approach based on search-by-explicit queries, in which the user must provide some description of a desired object. Typically, the system retrieves objects, such as images, based on a similarity metric that correlates the description with various features associated with stored objects in the database. The metric might be calculated as a weighted sum of values for a set of low level image (i.e., attributes) such as color, shape, size, and texture patterns.

A concern with image retrieval from databases is the difficulty in establishing a correlation between the worded description and the low level image features which are utilized to organize database images. An image database management system is effective at retrieving an image if the description is specific with respect to one or more of the searchable image features, such as a search for "all square yellow objects." However, the system will be much less effective if the description is less specific to the searchable image features and more specific to the desired object, such as a search for "all yellow cars," because cars have many different shapes and sizes that are shared by other objects. Moreover, the same car can appear dramatically different depending on the vantage point from which the image was generated and depending on the lighting of the car. Although human perception is effective at interpreting two images of the same yellow car which are taken in different lighting and from a different perspective, current image databases perform the interpretation much less effectively.

U.S. Pat. No. 5,696,964 to Cox et al. describes a queryless multimedia database search method and system having a Bayesian inference engine which utilizes user relevance feedback to direct a search. The system maintains a probability distribution which represents a probability that each image in the database is the target of the search. The distribution is utilized to select the set of images to display to the user and further selections from the displayed images are solicited from the user. Each database image has a set of quantified features (i.e., attribute values) and the user indicates which of the selected images are similar to the target image. The selection of particular images having specific quantified features triggers an adjustment of the probability distribution. The adjusted probability distribution determines the next set of images which will be displayed to the user in a subsequent iteration of the search.

One of the problems of the Cox et al. database search system is that the system relies on features selected by a system operator or designer to describe and index the database images. The user feedback is utilized to modify the probability distribution only within the parameters defined by the features that have been quantified. Consequently, if a user is focused on a feature not included within the system-defined features, the effectiveness of the Cox et al. database search system dramatically declines. For example, if a user focuses on the curvature of the neck of a flamingo in making selections during a search and the system does not include quantification which takes into account the curvature of objects within images, the likelihood of a successful search will be low. Although configuration of a more comprehensive feature set would provide a partial solution to this problem, a truly comprehensive feature set is difficult to obtain because of the near infinite variety of features on which possible viewers may focus in analyzing image content. Furthermore, as the feature set grows larger, the processing requirements of the database search system become prohibitive.

What is needed is a method and a system for searching and retrieving database objects which are capable of associating low level features ("attributes") utilized to characterize objects in the database with high level semantic features to enable effective database searching based on the high level semantic features.

SUMMARY OF THE INVENTION

A method and a system for indexing and retrieving database objects (typically images) include utilizing user relevance feedback received during a first object retrieval session to establish similarity correlations among the database objects and among clusters of database objects. The similarity correlations are updated continuously during user interaction with the database and are utilized to select database objects in response to query objects during subsequent iterations of a particular object retrieval session and during subsequent object retrieval sessions. The clusters are preliminarily determined by system-perceived relationships (i.e., similarities among system-quantified features), while after continued use the cluster-to-cluster correlations are indicative of user-perceived relationships among the groups.

In a preferred embodiment, the database objects are organized into clusters such that each cluster includes database objects having similar values for selected quantified features. Each database object is assigned a vector for multiple quantified features and can be mapped to a point within a multi-dimensional feature space according to the feature values associated with the database object. The similarity between clusters of database objects is represented by the distance between clusters in the multi-dimensional feature space. Thus, the initial organization is based exclusively on the system-perceived relationships. In response to a first user-generated query object which includes a set of quantified features, a database manager selects a first set of database objects for presentation to a user. The selected database objects are those objects within a cluster of the database which is closest to the first query object within the multi-dimensional feature space.

The selected database objects preferably also include randomly selected database objects to counteract a tendency of the system to "over learn" during a retrieval session and to present to the user database objects which otherwise would have a low probability of being selected during the retrieval session. For example, if the user selects an image of an airplane as relevant during a search for an image of a bird, the system might select only images of airplanes for consecutive iterations of the search. In order to reduce the likelihood that the system will progress along an inaccurate focus, at each iteration in a search random images are selected for presentation along with the other selected images.

The user designates particular database objects to be relevant to the retrieval session and other database objects to be irrelevant. In a preferred embodiment, in response to the user-designations of relevance and irrelevance, an updating mechanism updates the correlation matrix. For example, one of the clusters in the database might include images of yellow objects which are displayed to the user in response to the query image of a yellow car. In response to designations of relevance for images of a truck and a motorcycle and designations of irrelevance for images of a house and a flower, which are all included in a first cluster, the database processor divides the first cluster into two clusters. The first cluster retains the images of the truck and the motorcycle, which were determined by the user to be relevant, and a second cluster is created which includes the images of the flower and the house. Furthermore, other images of the first cluster which might not have been displayed must be segregated into either the first or second cluster. Those non-displayed images which have quantified features more similar to the relevant images will be maintained in the first cluster and those non-displayed images which have quantified features more similar to the irrelevant images will be located into the second cluster. The updating mechanism updates the correlation matrix by assigning a low correlation of similarity to the first and second clusters.

During a database object retrieval session, database objects from multiple clusters might be selected for presentation to the user. If two database objects from separate clusters are both determined by the user to be relevant to the first user-generated query object, the updating mechanism will take steps to ensure that the two clusters have a high correlation value within the correlation matrix. In configuring the clusters, if the database manager did not take into account the feature(s) which lead the user to determine that the two database objects are relevant to the query object, the two database objects will be distant from each other within the multi-dimensional feature space. By assigning a high correlation value to the two clusters, the system is embedding user feedback into the correlation matrix and enabling intelligent retrieval based on non-quantified "high level features." The correlation values are at least partially determined by user-perceived relationships among the clusters.

Over the course of multiple retrieval sessions, as a result of cluster divisions, the quantity of clusters can increase significantly. Eventually, the number of clusters will approach the number of database objects and the processing resources required to perform database object retrieval will rise accordingly. To counter this tendency, the database manager merges two clusters if a similarity threshold is exceeded. The similarity threshold takes into account the distance between the two clusters in the feature space, as well as the weight of the correlation between the two clusters in the correlation matrix.

An advantage of the invention is that the database can be initialized according to feedback from users to compensate for deficiencies in the original database initialization. A further advantage of the invention is that the correlation matrix enables custom tailoring of the retrieval system in response to user feedback. Yet another advantage of the invention is that the correlation matrix is continually refined through user feedback across multiple sessions.

DETAILED DESCRIPTION

Figure 1:
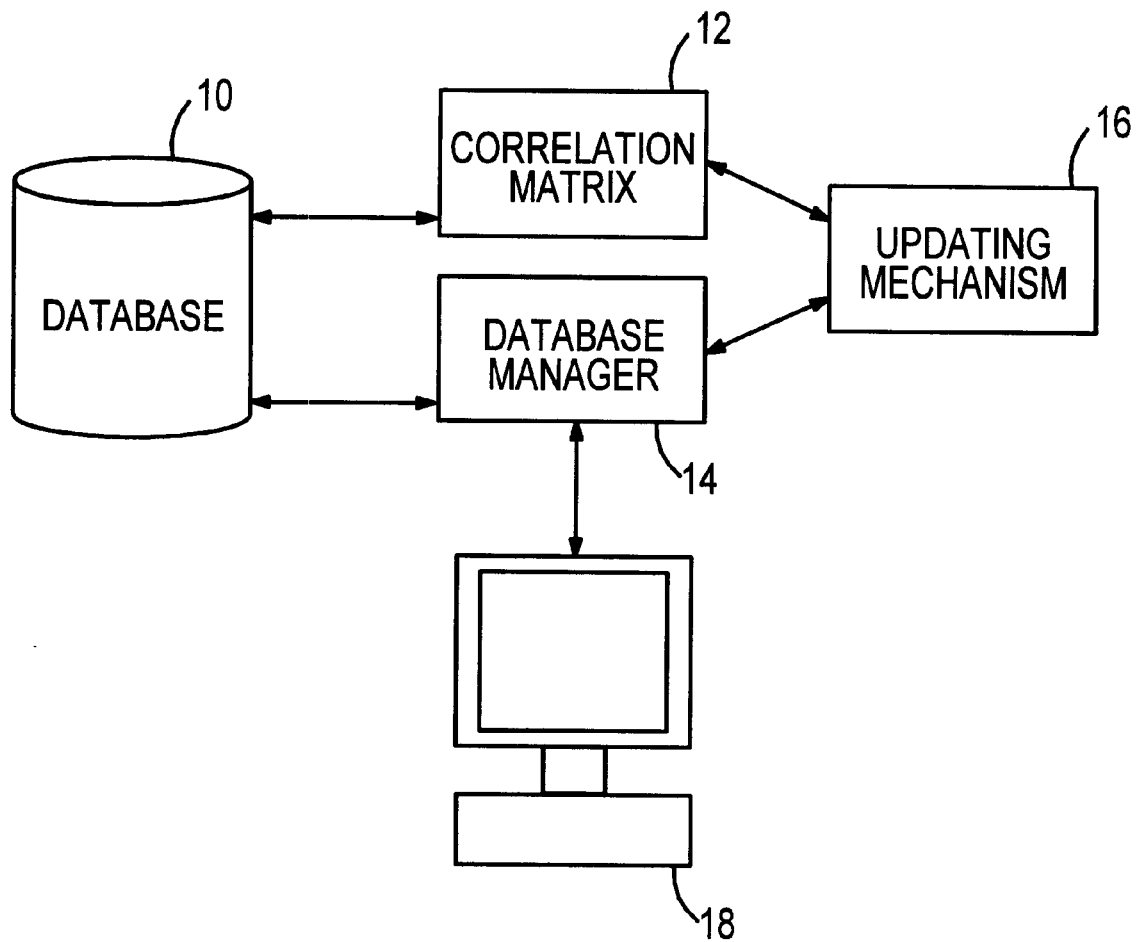
FIG. 1 is a block diagram of a system for indexing and retrieving database objects according to the present invention.

With reference to FIG. 1, a system for indexing and retrieving database objects includes a database 10. The database can include any number of different types of files including, but not limited to, image files, video files, audio files, graphics files, or text files. The database 10 can be centralized or distributed, or it can be located on the Internet. The invention can be practiced on a database of any type of file which is amenable to description by quantifying features or characteristics. As will be discussed in greater detail below, the database 10 is initialized by a database manager 14 prior to the first retrieval session. The initialization is based on feature vectors associated with the database objects. During the initialization, database objects having similar feature vectors are clustered into common clusters. The feature vectors can be low level features such as color, size, shape, and texture of the subject matter of stored images within an image database. Alternatively or additionally, the database objects can be initialized based on high level semantic features, such as vehicles, homes and persons. The greater the number of features which are quantified with the database objects, the more responsive and efficient the system is in performing retrieval in response to user-generated queries. The initialization of the database is indicative of system-perceived relationships among the objects and among the clusters.

User feedback received during object retrieval sessions is employed to establish a correlation matrix 12 which characterizes similarities between the database clusters. The correlation matrix can associate the clusters based on user-perceived relationships among the clusters. For example, if the database is an image database initialized to quantify only low level features, such as color, texture, and size, different images of houses might be contained in separate clusters. As a user navigates through the image database searching for images of houses, each house image the user encounters might be identified as relevant to a user-generated query. User feedback received from a personal computer 18, or some other device such as a web appliance or a personal digital assistant, is embedded into the correlation matrix 12 by assigning high correlation values to clusters which include objects that have been identified as relevant to the user-generated query object. An updating mechanism 16 is provided to update the correlation matrix via the database manager 14, so that subsequent searches will be guided by the correlation matrix to rapidly provide the user with relevant images from the database 10.

Figure 2:
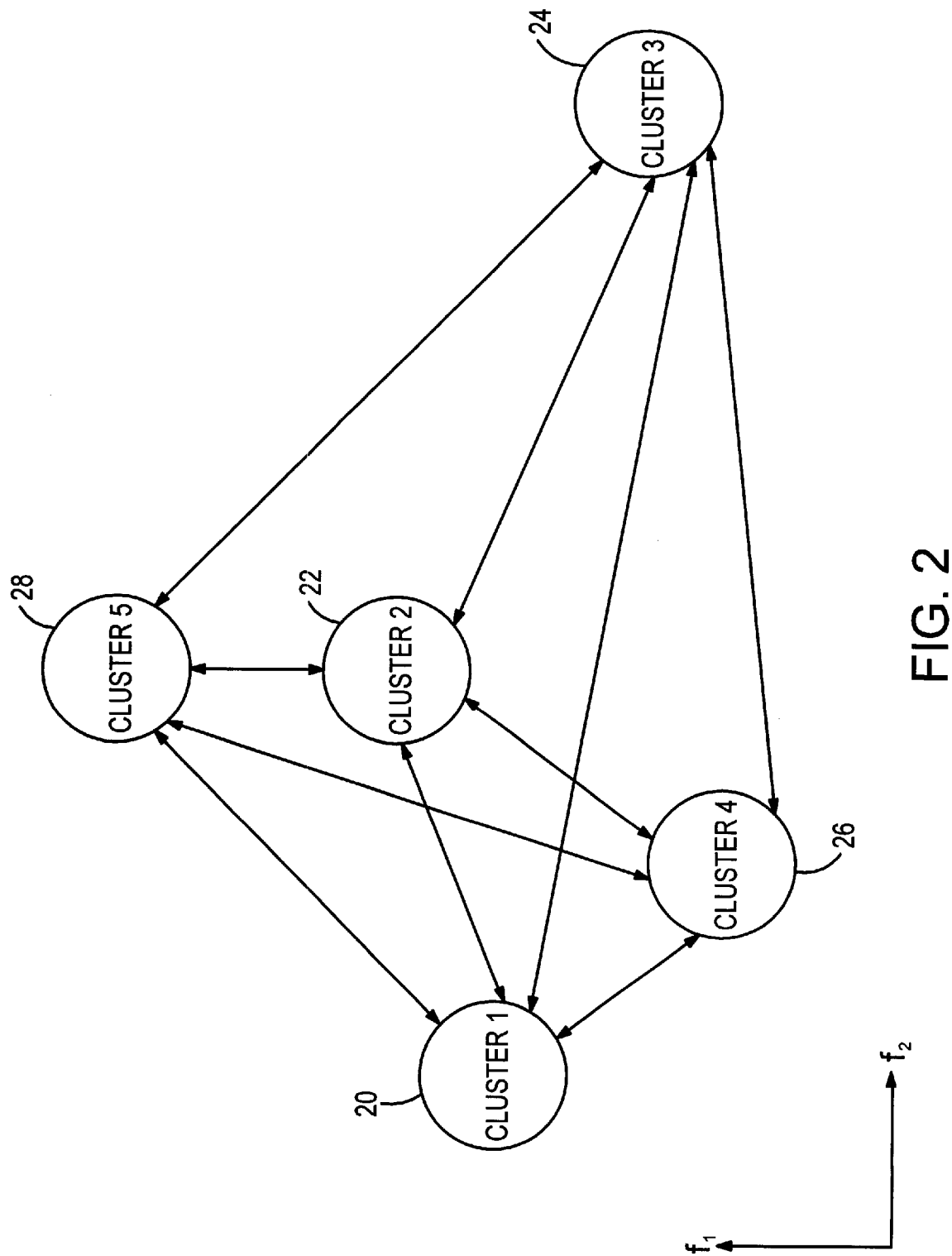
FIG. 2 is a schematic diagram of clusters of database objects within the database shown in FIG. 1.

Referring to FIG. 2, a simplified database includes five clusters of one or more database objects. First 20, second 22, third 24, fourth 26, and fifth 28 database clusters each contain database objects which are assigned values for two different features; $f_1$ and $f_2$. Alternatively, the database objects may be quantified with respect to more than two features (i.e., n features, where n is any whole integer). Each cluster in FIG. 2 is mapped within a two-dimensional feature space based on the feature vectors of its constituent objects. The process of grouping the objects into the clusters occurs during initialization of the database 10. Each cluster has a centroid and a variance. The centroid is the center of the cluster and the variance corresponds to the average distance between the centroid and all of the database objects of the cluster. The distance between two clusters represents a degree of system-perceived similarity between clusters. For example, in FIG. 2, the first cluster 20 is more similar to the fourth cluster 26 than it is to the third cluster 24. Because this degree of similarity is based on two features which represent only a small fraction of all attributes associated with the objects, the similarity described for the database clusters is almost certainly incomplete. That is, while the clustering of database objects may be logical with respect to the two features $f_1$ and $f_2$, with respect to some feature not considered by the database 10, the clustering might have little or no logic. As the correlation matrix 12 is updated, it provides a more perceptually relevant similarity picture among the clusters by embedding user feedback into the system.

In the preferred embodiment, when a user-generated query object is received by the object retrieval system, it is processed as if it were a database object most recently added to the database 10 of FIG. 1. In other words, feature vectors are calculated for the query object and the query object is mapped onto the feature space. Database objects are selected from the cluster which has a centroid closest to the query object and the selected database objects are displayed at the user computer 18. The user determines which of the displayed database objects are relevant to the query object and the information is communicated to the updating mechanism 16. If some of the displayed database objects are determined by the user to be relevant to the query object and other displayed database objects are determined to be irrelevant to the query object, the configuration of the clusters and the correlation matrix are updated to reflect the user's determinations of relevance and irrelevance.

Figure 3:
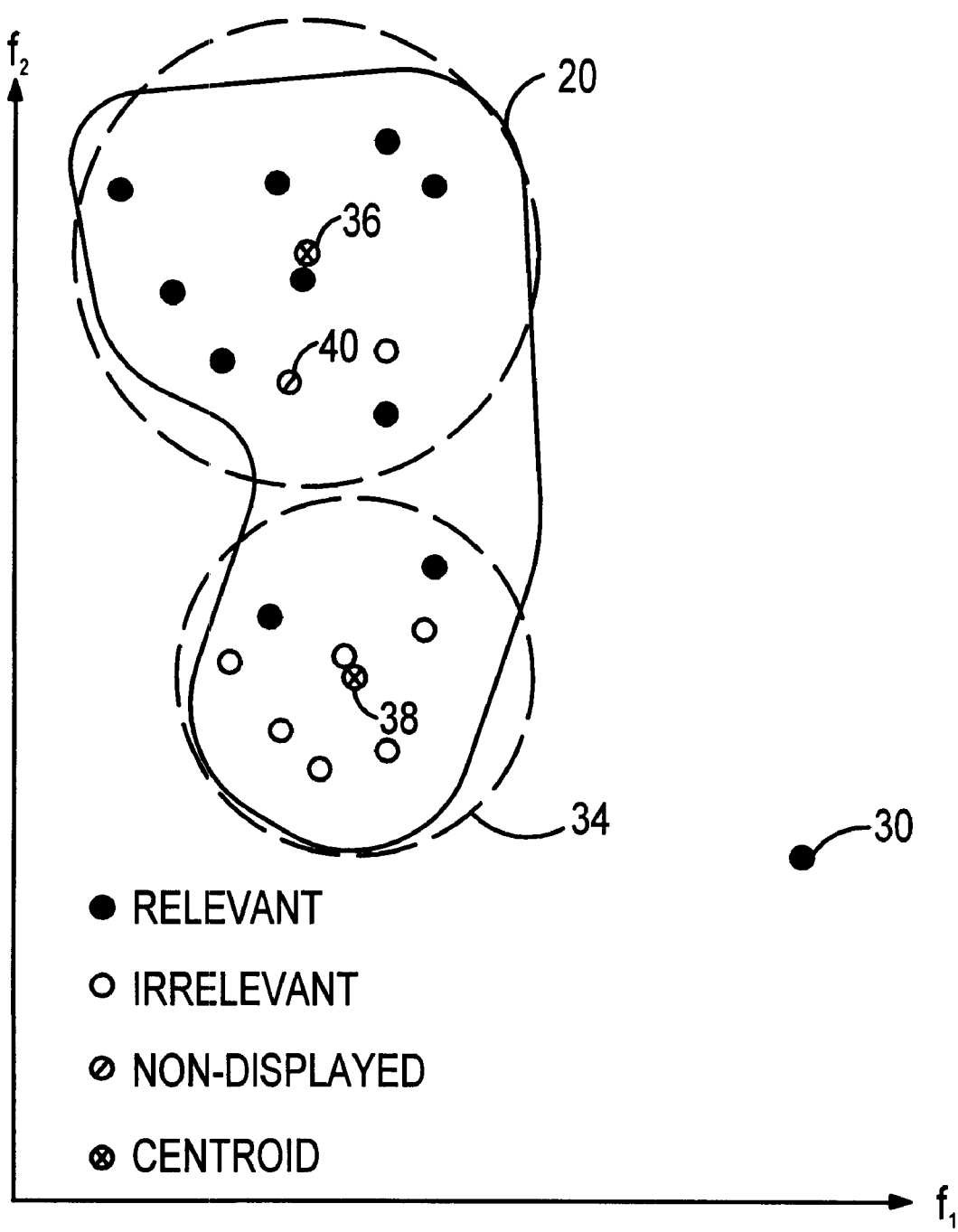
FIG. 3 is a schematic diagram of a cluster within the database of FIG. 1 which is to be split into two clusters.

Referring to FIGS. 1 and 3, database objects have been selected from the first cluster 20 for presentation at the user computer 18, and particular ones of the first cluster database objects have been designated by the user as being relevant to a query object 30, and other first cluster database objects have been designated as being irrelevant. The database manager 14 splits the first cluster into a reduced volume first cluster 20 and an added sixth cluster 34, such that the first cluster includes the database objects determined to be relevant to the query object and the sixth cluster includes database objects determined to be irrelevant. Any non-displayed objects 40 from the first cluster are re-clustered with relation to a first cluster centroid 36 and a sixth cluster centroid 38. In a preferred embodiment, the determination of whether a particular non-displayed database object is to be grouped within the first cluster 20 or the sixth cluster 34 is based on a ratio of the distance of the non-displayed object from the first cluster centroid to the distance of the non-displayed object from the sixth cluster centroid 38. If the ratio exceeds a predetermined threshold, the non-displayed object 40 is grouped into the reduced volume first cluster, as shown in FIG. 3.

The determination of which cluster the first non-displayed object 40 should be grouped into can be based on other approaches of comparing the distance between the first non-displayed object and the first cluster centroid 36 to the distance between the first non-displayed object and the sixth cluster centroid 38. The non-displayed object 40 will then be grouped into the cluster having a centroid closest to the non-displayed object.

After the first cluster objects have been split into the first cluster 20 and the sixth cluster 34, the correlation matrix 12 is updated to reflect that the first and sixth clusters have a low level of correlation, even though they are closely spaced in feature space. A weight $W_{16}$ which has a low value, for example 0, is assigned to the relationship between the first and sixth clusters to reflect that the first and sixth clusters contain dissimilar database objects. The weight $W_{16}$ substantially decreases the likelihood that any database objects from the sixth cluster will be displayed at the user computer 18 during subsequent search sessions that are similar to the session during which the first cluster 20 was split. That is, when the system encounters subsequent query objects which have similar feature vectors to the first query object, the likelihood is low that sixth cluster database objects will be selected during the subsequent session.

Figure 4:
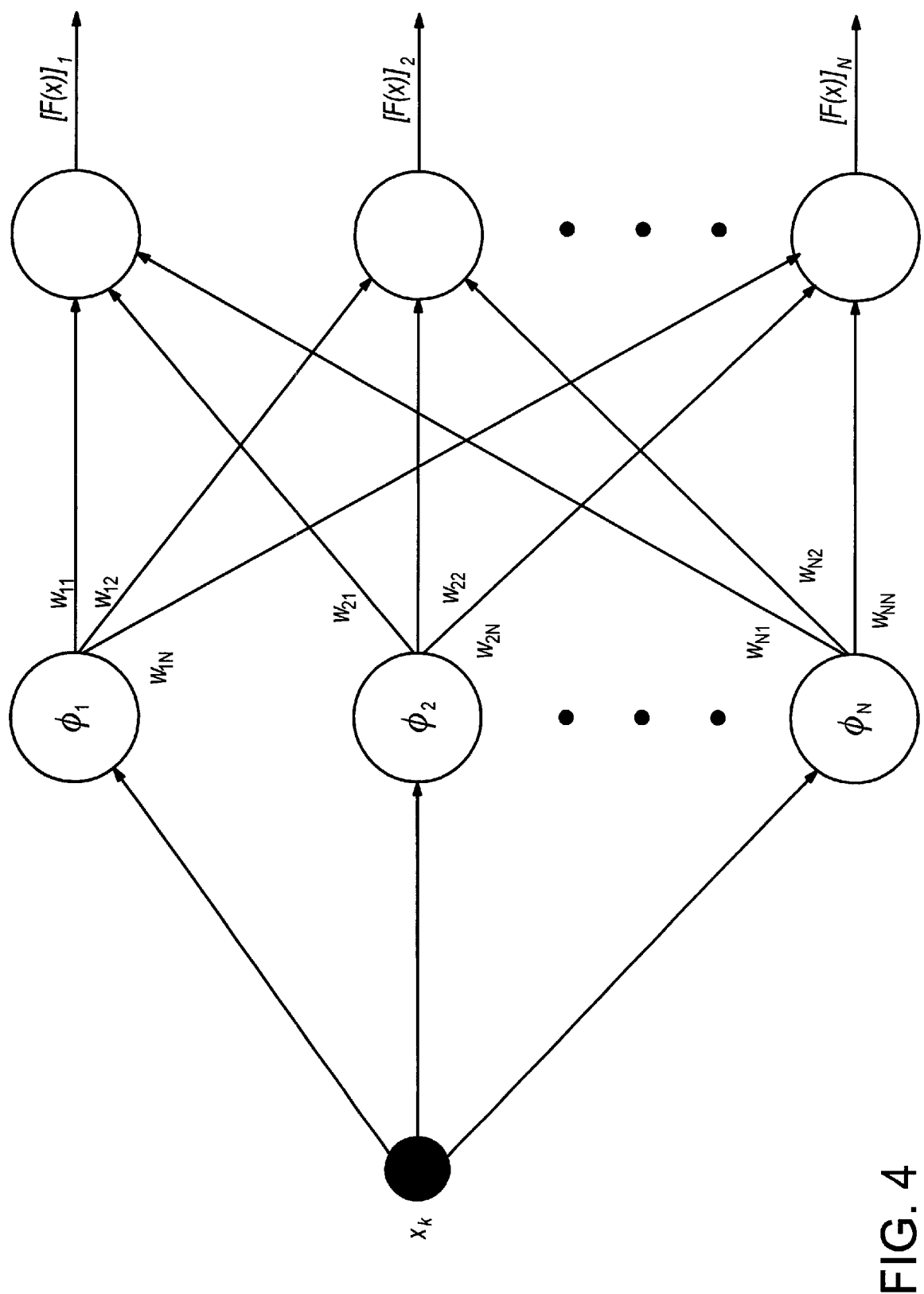
FIG. 4 is a schematic diagram of a Radial Basis Function network utilized by the system in FIG. 1 to update a correlation matrix.

A modified Radial Basis Function (RBF) transform is utilized to update the correlation matrix during and after a database object retrieval session. With reference to FIG. 4, an RBF network is shown, where x is the feature vector corresponding to an object, $\phi_N$ is the $N^{th}$ RBF, and $[F(x)]_n$ is the $n^{th}$ component of the transformed feature vector x in RBF feature space. Let x correspond to an arbitrary object feature vector of dimension W×1, let $c_n$ correspond to the centroid of the $n^{th}$ cluster in the feature space, and N correspond to the number of such clusters. The RBF technique consists of mapping x to F(x) according to the following equation:

$$[F(x)]_n = \phi(\|x - c_n\|), 1 \leq n \leq N,$$

where $[F(x)]_n$ is the $n^{th}$ component of F(x) and $\phi(\|x-c_n\|)$ is a set of arbitrary, generally nonlinear functions known as the Radial Basis Functions. The $n^{th}$ component of F(x) is proportional to the distance between x and $c_n$. The components of F(x) give some indication as to which cluster x belongs and the modified RBF represents the membership function of each object to a cluster. As will be discussed in greater detail below, the present invention transforms each object vector to F(x) using the modified RBF transform to update the weights between the clusters in the database 10, so that the weights reflect the similarities between clusters as determined by the relevance feedback from the user.

The correlation matrix is utilized to update the weights associated with the database clusters, where M corresponds to the correlation matrix and where $$M = \begin{bmatrix} w_{11} & w_{12} & \cdots & w_{1N} \\ w_{21} & w_{22} & \cdots & w_{2N} \\ \vdots & \vdots & & \vdots \\ w_{N1} & w_{N2} & \cdots & w_{NN} \end{bmatrix}$$

and N is the number of clusters. Suppose for a given iteration, n+m objects are displayed, and the user marked n objects as being relevant and the remaining m objects as being irrelevant to a query object. Let q be the query feature vector, let $\{p_i, 1 \leq i \leq n\}$ be the positive feedback feature vector, and let $\{n_i, 1 \leq i \leq m\}$ be the negative feedback feature vector. The correlation matrix is updated as follows:

$$M_k = M_{k-1} + \sum_{i=1}^{n} F(q)F(p_i)^T - \sum_{i=1}^{m} F(q)F(n_i)^T,$$

where $F(x)$ is the transformed vector of x using the modified RBF transform, $M_0 = I_{N \times N}$.

As an example of the correlation matrix updating scheme, suppose q is the query object feature vector, $x_1$ is a relevant feature vector, $x_2$ is an irrelevant feature vector, and the number of clusters is N=4. Let q be a member of the first cluster 20, let $x_1$ be a member of the second cluster 22, and let $x_2$ be a member of the third cluster 24. Suppose $F(q)=[1\ 0.1\ 0.05\ 0.2]$, $F(x_1)=[0.2\ 1\ 0.15\ 0.3]$, and $F(x_2)=[0.05\ 0.2\ 1\ 0.25]$ after applying the RBF transform to q, $x_1$, and $x_2$. Then $$M_R = F(q)F(x_1)^T = \begin{bmatrix} 0.2 & 1 & 0.15 & 0.3 \\ 0.02 & 0.1 & 0.015 & 0.03 \\ 0.01 & 0.05 & 0.0075 & 0.015 \\ 0.04 & 0.20 & 0.03 & 0.06 \end{bmatrix}$$

$$M_{IR} = -F(q)F(x_2)^T = -\begin{bmatrix} 0.05 & 0.2 & 1 & 0.25 \\ 0.005 & 0.02 & 0.1 & 0.025 \\ 0.0025 & 0.01 & 0.05 & 0.0125 \\ 0.01 & 0.04 & 0.2 & 0.05 \end{bmatrix}$$

and $$M_1 = I_{4 \times 4} + M_R + M_{IR}.$$

Note that the $W_{12}$ entry of $M_R$ is a large positive value, 1, which indicates that the first cluster 20 and the second cluster 22 are positively correlated, whereas the $W_{13}$ entry of $M_{IR}$ has a large negative value, -1, indicating that the first cluster 20 and the third cluster 24 are negatively correlated. Because the modified RBF transforms of a feature vector x represents the inclusion of x within a cluster, the outer product of $F(x)$ with a query vector embeds the correlation between the cluster containing x and the cluster containing q. Using the correlation matrix to update the weights of the database clusters allows the system to learn the correlation between clusters through relevance feedback. The weights the system learned can be remembered across sessions with the user by continually saving the updated correlation matrix and the configuration of database clusters.

Significantly, the correlation matrix is not symmetric. For example, suppose the correlation between object clusters in FIG. 2 is inversely proportional to the distance between the clusters. Although the second cluster 22 is the most closely correlated cluster to the third cluster 24, the third cluster 24 is not the most closely correlated cluster to the second cluster 22. Instead the fourth cluster 26 is the most closely correlated cluster with the second cluster 22. Thus, for the correlation matrix to be symmetric, each row must be normalized by a different scaling factor. That is, there does not exist an absolute measure of correlation since only relative correlation is computed.

The modified RBF transform is utilized to provide membership information between database objects and the clusters and the membership information is utilized to update the weight between two clusters if both of the clusters include database objects which were determined by the user to be relevant to a query object. For example, referring to FIG. 2, if a first query object is determined by the user to be relevant to a first cluster database object and a third cluster database object, the correlation matrix utilizes the modified RBF transform to produce a weight $W_{13}$ with a high value. If the previous weight associated with the first and third clusters had a low value, the increased weight associated with the first and third clusters can have a significant impact on future searches. By assigning the high value for $W_{13}$, the system embeds the user feedback into the correlation matrix. If a subsequent search is performed utilizing a second query object similar to the first query object, the increased weight between the first and third clusters will likely result in a more efficient selection of relevant database objects for presentation to the user.

As previously noted, when some database objects within a cluster are determined by the user to be relevant to a query object and other database objects within the same cluster are determined to be irrelevant, the cluster is split, so that one of the resulting clusters contains only relevant objects and the other cluster contains only irrelevant objects. After numerous sessions, the number of clusters could potentially approach the number of database objects if no mergers of clusters occurs. As the number of clusters within the database 10 increases, the processing resources required to maintain the database 10 and the correlation matrix increases. To counteract the tendency to increase the number of clusters, clusters that are located closely within feature space and which are highly correlated within the correlation matrix 12 are merged. The threshold for how closely spaced and how closely correlated the clusters must be in order to merge the groups can be set by an operator of the database object retrieval system according to requirements of the system. For example, if the database 10 includes a relatively small number of database objects, merging the database objects into clusters might not be a significant consideration because of the low processing requirements of the database.

Figure 5:
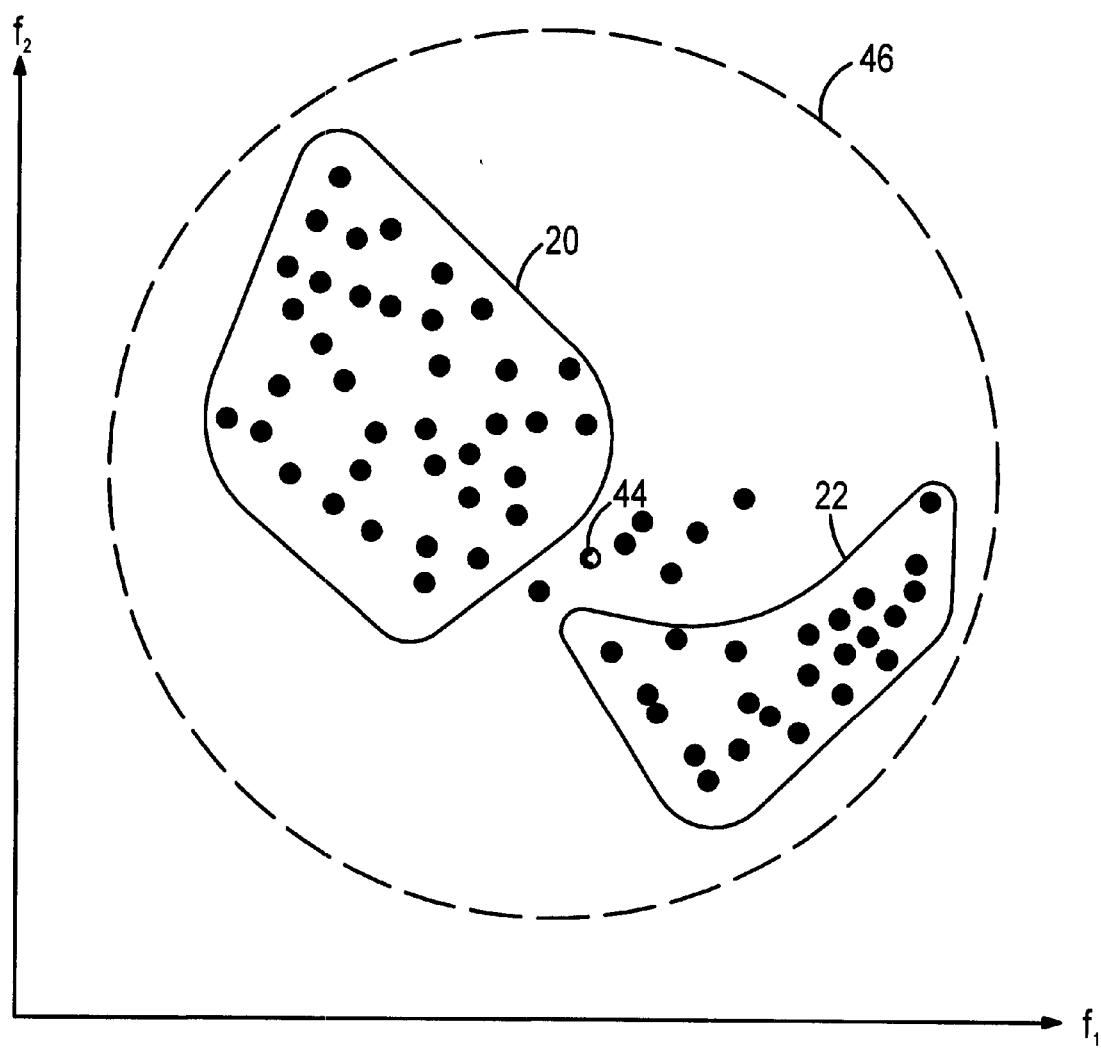
FIG. 5 is a schematic diagram of two clusters within the database of FIG. 1 which are to be merged into a single cluster.

In a preferred embodiment, clusters with low variances are selected as candidates for merging. The low variance associated with a particular cluster indicates that the images within the cluster are very similar to each other. For each candidate cluster, a set of clusters is selected that are highly correlated with the candidate cluster. For example, referring to FIG. 5, the first cluster 20 is the candidate cluster and the second cluster 22 is selected from the set of clusters highly correlated with the first cluster. A centroid c 44 is calculated for a proposed merged first-cluster/second cluster. The system examines all the database objects located within a circle 46 centered at centroid c 44 such that the circle 46 encompasses all database objects within the first 20 and second 22 clusters. The closeness of the two clusters is defined as:

$$D = \frac{\text{Number of images in cluster 1 and cluster 2}}{\text{Total number of images lying in circle 46}}$$

If D is approximately equal to 1, then the first cluster and the second cluster are considered to be close to one another. If D is approximately equal to 0, then the groups are considered to be far from each other, because the circle 46 encompasses numerous images which are not within the first 20 or second 22 clusters. If the first and second clusters are determined to be sufficiently close to one another because D exceeds a predetermined threshold, then the first cluster 20 and the second cluster 22 are merged into a new cluster with centroid c 44. The merging process may be configured to maintain the number of clusters above a specified minimum number and below a specified maximum number of clusters. After the merging of the groups, the correlation matrix is updated to reflect the merger. Specifically, cluster designations within the matrix must be adjusted and a matrix column and a row must be deleted.

Figure 6:
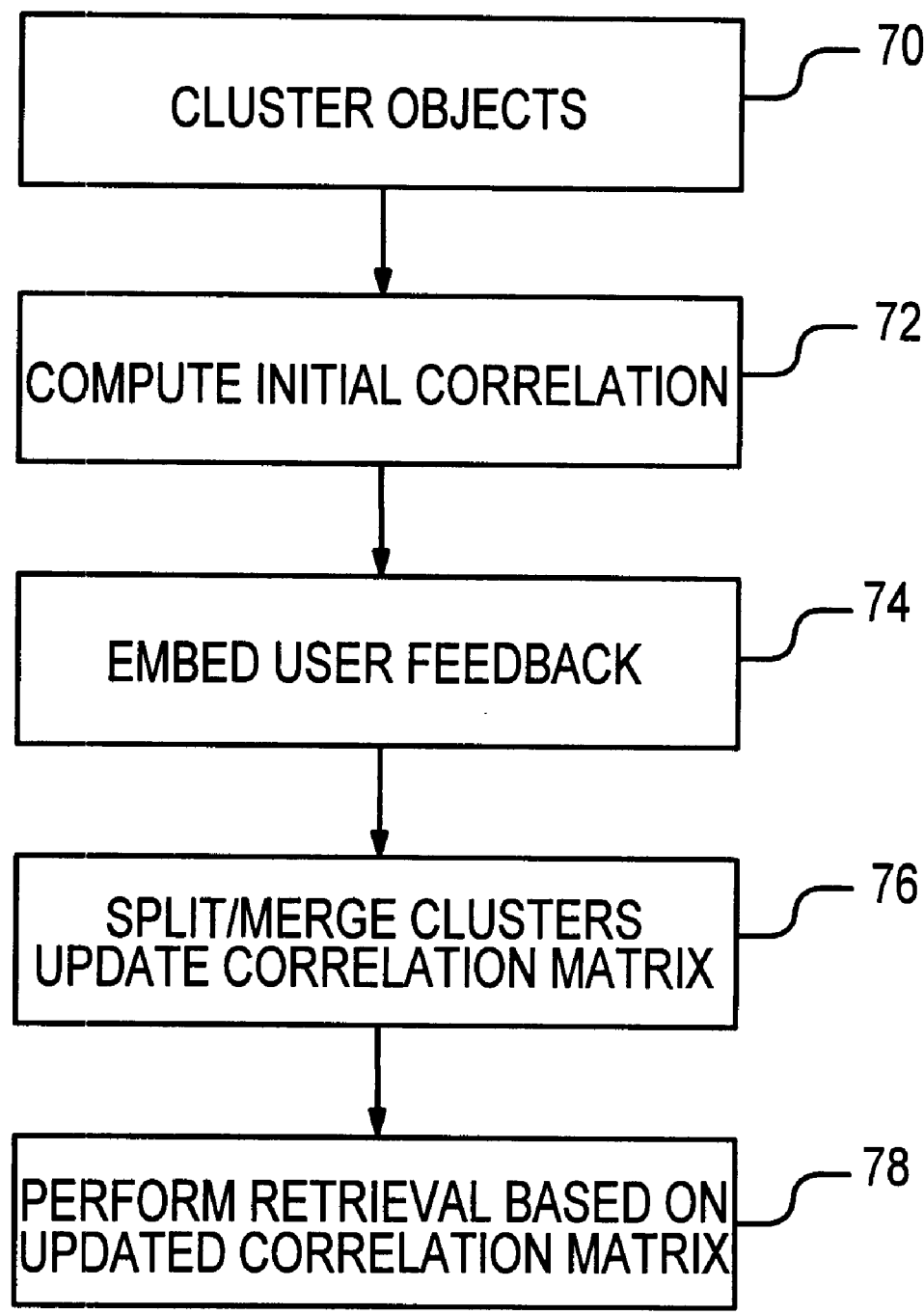
FIG. 6 is a process flow of a basic indexing and retrieval method utilizing the system of FIG. 1.
Figure 7:
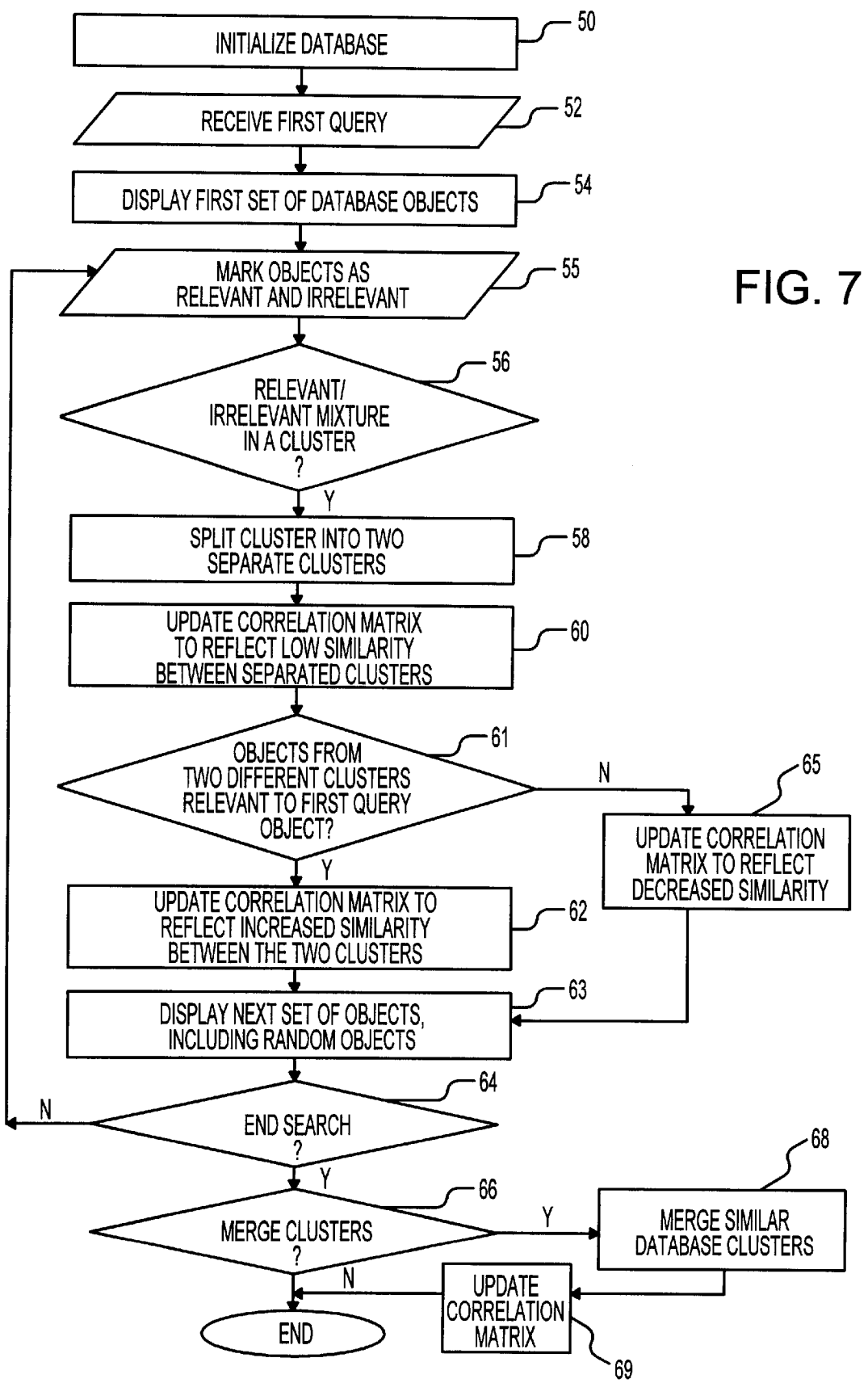
FIG. 7 is a preferred embodiment of the indexing and retrieval method shown in FIG. 6.

With reference to FIG. 6, the basic steps for indexing and retrieving database objects according to the present invention include the step 70 of grouping database objects, for example stored images, into clusters. The database objects are clustered based on objectively quantified features so that objects with similar feature vectors are located within the same cluster. The list of possible features includes but is not limited to color, shape, size, and texture. Each cluster has an associated centroid which corresponds to the center of the cluster and a variance which represents the average distance between the centroid and its constituent objects. In step 72, an initial correlation matrix is computed for the object clusters. The initial correlation matrix might be based on the distances between the centroids of the clusters so that clusters having closely spaced centroids have a higher correlation than clusters having more distantly spaced centroids. However, the initial correlation matrix need not necessarily be computed prior to the first retrieval session. Instead, the initial retrieval session can be initiated by a random selection of images for presentation to the user. The user feedback is then utilized to simultaneously cluster the images and embed user feedback into the correlation matrix.

The user responses during a retrieval session form the basis for embedding user feedback into the correlation matrix in step 74. Embedding user feedback includes splitting and merging clusters and updating the correlation matrix in response to user designations of relevance and irrelevance. For example, in step 76 when the user identifies a query object as being relevant to a first selected object from a first cluster and a second selected object from a second cluster, a correlation weight assigned to the first and second clusters is updated to reflect the user-indicated similarity. On the other hand, if the user identifies a first selected object as being relevant to the query object and a second selected object from the same cluster as being irrelevant, that cluster may be split and a low correlation weight is assigned to the resulting two clusters. Step 76 also includes a merging step which is preferably performed off-line after a session has been terminated. Clusters which have a high correlation and are closely spaced within the feature space are merged in order to reduce the number of clusters. In step 78, object retrieval is performed utilizing the updated correlation matrix which has been embedded with user feedback.

With reference to FIGS. 1, 2, 3, and 7, a method for database search and retrieval includes the step 50 of initializing the database 10 according to feature vectors associated with the database objects. In this step, the clusters and correlations are determined exclusively by system-perceived relationships. For example, if the database contains image files, the database manager 14 might initialize the database 10 according to low level features of the images, such as color, texture, shape, and size. The images files are clustered according to feature vector similarities, such that image files having similar feature vectors are clustered into common clusters. The clustering may be determined by mapping the images to a multi-dimensional feature space according to the feature vectors associated with each image. The distance between two database clusters in the multi-dimensional space is proportional to a preliminary degree of similarity between the clusters. Initially, a cluster-to-cluster weight is based on this degree of similarity between the two clusters. However, the degree of similarity will be supplemented within the correlation matrix 12 based on user feedback in subsequent search sessions.

In step 52, a first query image is received from the user computer 18. The database manager 14 processes the first query image to calculate query image feature vectors. The query image feature vectors are utilized to map the feature vector of the first query image to a location within the feature space. In step 54, images are selected and displayed to the user from a cluster which is closest to the first query image, for example the first cluster 20. Alternatively, the database manager 14 might select and display images from more than one cluster. For example, images can be randomly selected for presentation along with the images selected based on feature vector similarity to counter the tendency of the database manager 14 to over learn during a search session and to broaden the scope of the search. Furthermore, if the user has requested twenty images for a first iteration of a search and the first cluster contains only five images, images from the next closest cluster will also be selected for presentation to the user.

The selection order of images within a cluster is based on the distance in feature space between the query image and the various images within the cluster. For example, if a user requests five images and twenty images reside within a cluster, the five images closest in feature space to the query images are selected for presentation to the user. If five additional images are requested in a subsequent iteration, the next five closest images from the cluster are selected. In contrast, selection order of images within two different clusters is governed by the correlation matrix. That is, images are first selected from a cluster with the highest correlation to the query image. Only when all images from that cluster have been presented to the user will images from a lower correlated cluster be selected. Furthermore, the images from the subsequently selected cluster are not necessarily the next closest cluster in image feature space. Instead, the subsequently selected cluster is the next most closely correlated cluster within the correlation matrix.

At step 55, the user has the opportunity to designate the relevance or irrelevance of each selected image with regard to the first query image. Upon receiving indications of relevance or irrelevance for the displayed images, in step 56, the database manager 14 determines whether some of the selected images from one of the clusters have been determined by the user to be relevant, while other images from the same cluster have been determined to be irrelevant. If all of the displayed images from the first iteration have been determined to be relevant or all the selected images have been determined to be irrelevant (i.e., there is no mixture of relevant and irrelevant objects within a group), a second set of images is selected for presentation to the user based on the initial correlation matrix. The initial correlation matrix is utilized during the second iteration because the correlation matrix is not affected if, during the first iteration of a retrieval session after database initialization, all selected images from the first cluster 20 are determined to be either relevant or irrelevant.

If in step 56 the database manager 14 determines that some of the first cluster images are relevant and others are irrelevant to the first query image, in step 58, the first cluster 20 is split into two clusters. The first cluster retains the relevant images, while a newly created sixth cluster will include all images determined by the user to be irrelevant. In step 60, the correlation matrix is updated to add the newly created sixth cluster. The weight for the first and sixth clusters within the correlation matrix is set to a low value, for example 0, to indicate that the first and sixth clusters have a weak correlation.

In step 61 it is determined whether images from two different clusters have been identified as relevant to the first query image. If so, the correlation matrix is updated to reflect the increased similarity between the two clusters in step 62. If an image from one cluster is identified as relevant while an image from a second cluster is identified as irrelevant, the weight assigned to the two clusters within the correlation matrix is decreased in step 65 and the next set of images is selected in step 63. The second set may include the previously designated relevant objects and a number of objects from the third cluster 24.

In step 64, the system determines whether the search is to be terminated (i.e., whether the user has taken action that indicates satisfaction with the results of the search session). If the search is to be continued, the process again returns to step 55. On the other hand, if the search is to be terminated, in step 66 the database manager 14 determines whether any database clusters should be merged. The determination of whether to merge clusters and the merger itself preferably occur off-line after the search has terminated, thereby conserving processor resources during the search. If two clusters are identified as having centroids that are closely located within the feature space and the two clusters have a high correlation value in the correlation matrix, in step 68 the clusters are merged into a single cluster. After the merger has been performed, in step 69 the correlation matrix is once again updated to reflect the merger.

Although the method has been described above as being practiced on database images, any type of database file can be substituted for image files including, but not limited to, audio files, text files, spreadsheet files or graphics files. Additionally, while the method has been described as using query objects to initiate a search, this is not critical. As one alternative, a randomized selection of images from various clusters may be presented in a first iteration of a search session, with the user-designations of relevance and irrelevance being employed to narrow search results in the subsequent iterations of the session. As another alternative, the search may be initiated by a word description that is converted to a feature vector.

The disclosed system and method can be implemented as hardware, software, or a combination of both. The system can operate on a computer or a special purpose device.

What is claimed is:

1. A method of managing objects of a database comprising steps of:
   presenting first database objects in response to a search query of a first search session;
   enabling a user to designate a first subset of said first database objects as being relevant to said first search session and to designate a second subset of said first database objects as being irrelevant to said first search session;
   at least partially based upon designations of said first and second subsets, organizing said objects of said database into multi-object groups and defining correlations among said groups, organization of a plurality of said objects into a specific said group being indicative of content similarities among said objects, said correlations being indicative of user-perceived similarities among said groups; and
   storing said organization of said groups and said defined correlations among said groups for access during a second search session following completion of said first search session.

2. The method of claim 1 further comprising a step of indexing said objects of said database prior to said first search session, including forming a preliminary organization of said objects into initial groups, wherein said step of organizing said objects reconfigures said preliminary organization based on said designations of first and second subsets.

3. The method of claim 2 further comprising a step of presenting a second iteration of second database objects during said first search session, said second database objects including said first subset of first database objects that were designated as being relevant, said second database objects further including objects from a group having a predefined correlation with said first subset.

4. The method of claim 1 wherein said step of presenting said first database objects includes randomly selecting objects from a plurality of groups.

5. The method of claim 2 wherein said step of indexing includes quantifying a plurality of attributes for each object and determining an attribute vector for said each object based on said quantifications, said preliminary organization being based on said attribute vectors for said objects.

6. The method of claim 5 further comprising a step of reconfiguring said correlations and said groups during each search session subsequent to said first search session, said reconfiguring being based on user designations of relevant and irrelevant objects during said each search session, said reconfiguring including forming a correlation matrix that links said groups and quantifies similarity correlations among said groups.

7. The method of claim 6 wherein said step of reconfiguring said correlations and said objects includes a step of formulating membership functions for an object such that said object has a different membership function for said each group, each membership function describing a membership of said object within one of said groups.

8. The method of claim 7 wherein said reconfiguring step further includes formulating membership functions for a query object included in said search query, each query object membership function describing a degree of membership of said query object within one of said groups.

9. The method of claim 7 wherein said step of reconfiguring said correlations includes integrating attribute information associated with said object into said each membership function to describe degrees of membership of said object within each of said groups.

10. The method of claim 6 wherein said step of reconfiguring includes dividing a first group into two separate groups in response to designations that both relevant objects and irrelevant objects reside in said first group.

11. The method of claim 10 wherein said step of reconfiguring further includes merging at least two of said groups into a merged group at least in part in response to determining that a correlation value that is representative of similarities between said groups exceeds a predetermined threshold.

12. The method of claim 11 wherein said step of reconfiguring further includes assigning correlation weights based upon designations of relevant and irrelevant objects.

13. A system for organizing and retrieving database objects comprising:
   a database of objects, each object having an assigned value for each of a plurality of object features, said objects being organized into a plurality of groups, said groups having group-to-group correlations partially based on similarities among said assigned values and partially based on group-to-group correlation values that are representative of perceived similarities among said groups;
   an object selection subsystem responsive to receiving search queries of search sessions to select objects for display based on said groups and said correlations;
   a user device for enabling a user to designate a first subset of selected objects as being relevant to a search session and a second subset of said selected objects as being irrelevant to said search session; and a configuration module responsive to designations of said first and second subsets via said user device to manage said objects with respect to at least one of assigning said objects into groups and assigning said correlations, said assigned groups and said assigned correlations thereby being at least partially based on said designations of said first and second subsets.

14. The system of claim 13 wherein said configuration module is responsive to designations of relevant and irrelevant objects in a single group to divide said single group into first and second groups such that said first group includes first objects designated to be relevant and said second group includes second objects designated to be irrelevant.

15. The system of claim 14 wherein said configuration module is responsive to said division of said single group to assign a low correlation of similarity to an association between said first and said second groups.

16. The system of claim 13 wherein said configuration module is configured to assign a high correlation of similarity to an association between a first object group and a third object group which both include database objects that have been determined to be relevant to a first search query object.

17. The system of claim 16 wherein said object selection subsystem is configured to select objects from said first group and said third group during an iteration of an object retrieval session which includes a second query object, said selection of said objects from said first and said third groups being based at least partially upon said high correlation of similarity between said first and said third object groups.

18. The system of claim 13 wherein said object selection subsystem is configured to include random objects among said objects selected for display.

19. A method of managing objects within a database utilizing user feedback comprising steps of:

configuring said objects into a network of clusters based on values of quantified features of said objects and based on correlations among said clusters;

detecting a first search query of a search session;

selecting a first set of objects determined to be responsive to said first search query, including basing said selecting upon said values and said correlations, said first set including objects from each of first and second clusters;

embedding user feedback into a correlation matrix that defines said correlations among said clusters in said network, including:
(a) assigning a high correlation to linking said first and said second clusters if objects within each of said first and second clusters are designated by a user to be relevant to said search session; and
(b) splitting said first cluster into a third and fourth cluster if said first cluster is designated by said user to include both relevant and irrelevant objects with respect to said search session; and storing said correlation matrix after embedding said user feedback for use in subsequent search sessions.

20. The method of claim 19 further comprising a step of merging said first cluster with a fifth cluster if it is determined that (1) said values of quantified features for objects in said first cluster are within a similarity threshold with respect to said values of quantified features for objects in said fifth cluster and (2) said first and said fifth clusters are assigned a correlation above a threshold correlation value.

21. The method of claim 19 wherein said step of selecting said first set of database objects includes randomly selecting a plurality of objects to diminish the probability of selecting only irrelevant objects during consecutive iterations of said search session.

22. The method of claim 19 further comprising the steps of:

selecting a second set of objects in response to receiving a second query, said selecting being based at least in part on said stored correlation matrix; and updating said correlation matrix based on user feedback which includes user-generated determinations of relevance for a first portion of said second set of objects and user-generated determinations of irrelevance for a second portion of said second set of objects.

23. The method of claim 19 further comprising the step of decreasing a correlation assigned to said first and said second clusters if objects from one of said first and said second cluster are designated as being relevant to said search and objects from the other of said first and said second cluster are designated as being irrelevant to said search.

* * * * *